//

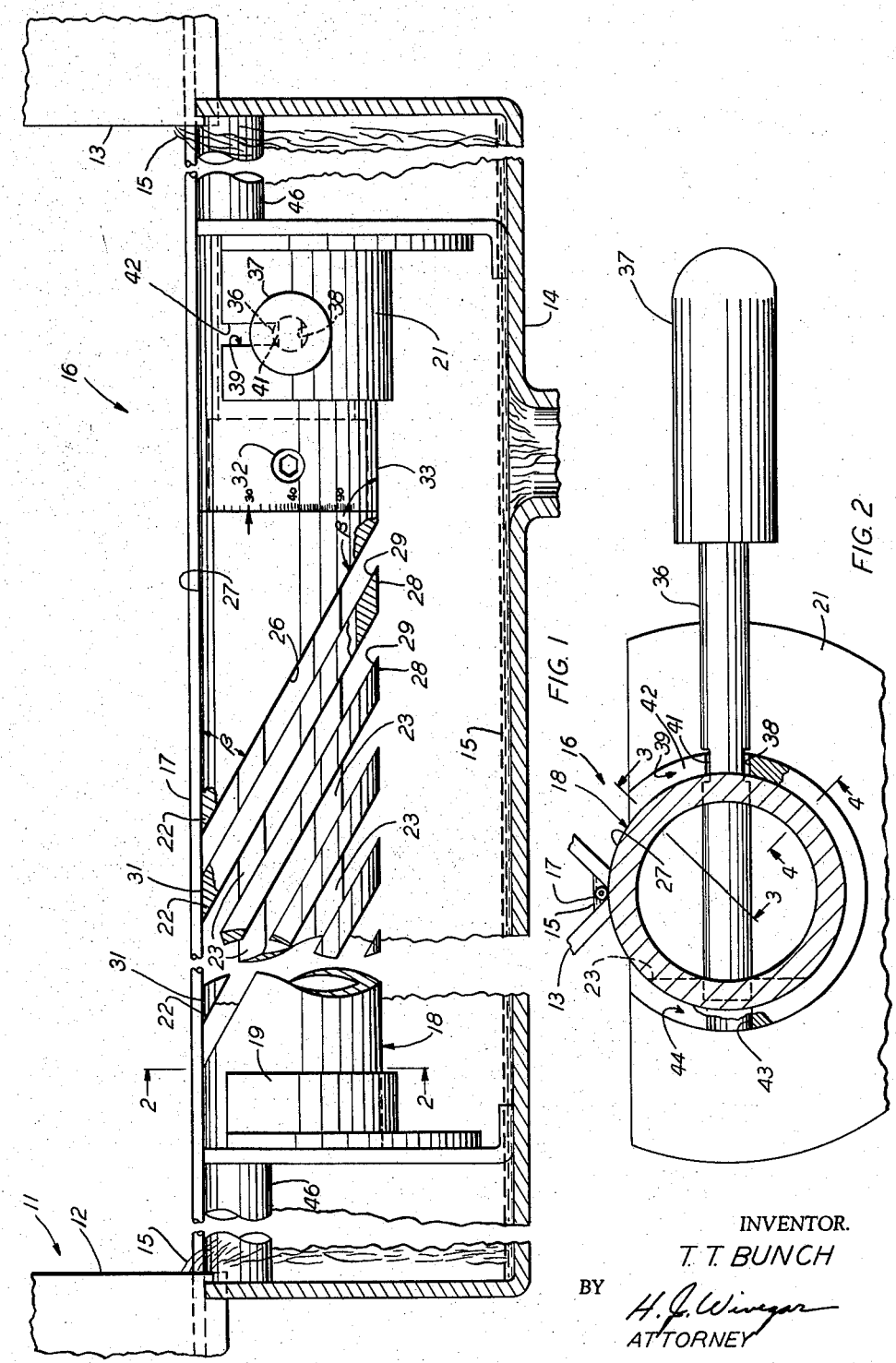

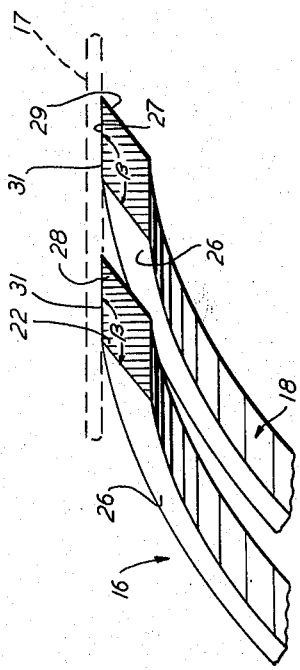
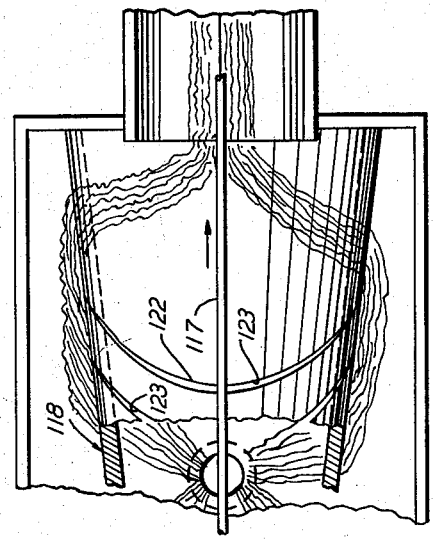
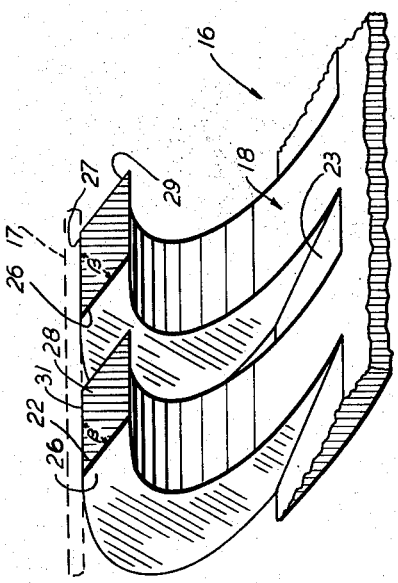
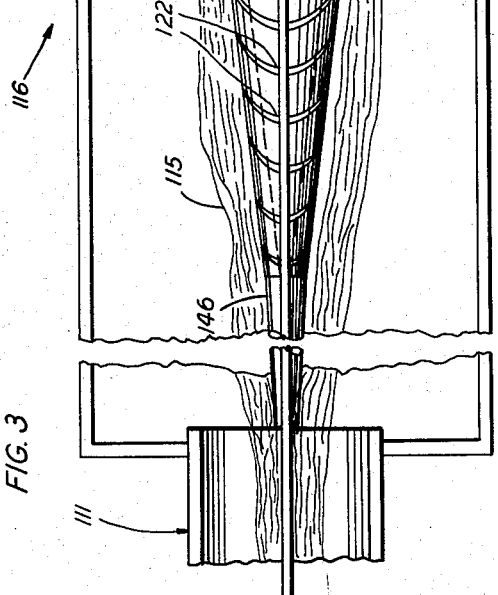

United States Patent Office 2,961,775
Patented Nov. 29, 1960

2,961,775

DEVICES FOR REMOVING FLUID FROM THE SURFACE OF STRAND MATERIAL

Tillman T. Bunch, near Ashland, Md., assignor to Western Electric Company, Incorporated, New York, N.Y., a corporation of New York Filed Apr. 10, 1959, Ser. No. 805,469

7 Claims. (Cl. 34—95)

The present invention relates to devices for removing fluid from surfaces of indefinite lengths of strand material, and more particularly, although not exclusively, to devices for removing water adhering to insulated conductors.

During the manufacture of plastic-insulated conductors, water cooling baths are utilized to remove the heat of extrusion from an insulated conductor as the insulated conductor exits from the extruder. Quite often the cooling bath is in the form of a V-shaped trough containing a cooling fluid, such as water. It is customary to pass the insulated conductor existing from the cooling trough through an air wiper to remove the moisture therefrom, so that the insulated conductor will be dry when it is wound on a take-up reel or is passed through a succeeding manufacturing process. Air wipers are relatively expensive to operate and are a source of undesirable factory noise. Therefore, it is desirable to eliminate these and other disadvantages resulting from the use of air wipers. Further, when an insulated conductor is passed from one section of a cooling trough to another, cooling fluid clinging to the surface of the insulated conductor and cooling fluid advancing adjacent to the surface of the insulated conductor, as a result of the high speed of the fluid resulting from a pumping action of the moving insulated conductor, cause splashing of the water as it impinges against the water in a succeeding section of the trough.

An object of the present invention is to provide new and improved devices for removing fluids from the surfaces of indefinite lengths of strand material.

A further object of the present invention is to provide a new and improved device which is adjustable to facilitate removal of fluids having different properties from the surfaces of indefinite lengths of strand material having different properties.

A still further object of the present invention is to provide a new and improved device for removing water from the surface of an indefinite length of a plastic insulated conductor existing from a water bath, which device may be indexed when the direction of travel of the conductor is reversed so that the device is effective when the conductor is passing longitudinally thereof in either direction.

A device for removing fluids from the surfaces of strand material embodying certain principles of the present invention may include a series of sharp edges and a series of smooth-surfaced supports are interspersed between the sharp edges for supporting the strand material. The sharp edges extend generally transversely of the strand and point in a general direction opposite to that of the path of travel of the strand material. The fluid clinging to the surface of the strand material will be removed therefrom by the sharp edges, thus eliminating the necessity for using an air wiper or other means to dry the strand material.

More specifically, the sharp edges, each defining an arc of an ellipse, may be formed in an elongated, cylindrical tube by milling parallel slots through the wall of the cyindrical tube at desired angles with respect to the longitudinal axis thereof. One side of each of the sharp edges is formed by the planar surface of the adjacent side of the associated slot, and the other side of the sharp edge is formed by the curved, arcuately shaped, outer surface of the tube. Therefore, the shape of the sharp edges formed by the included angle of the intersection of the planar surface and the arcuate surface on different radial planes containing the longitudinal axis of the tube will vary. The shape of the sharp edge presented to successive portions of an indefinite length of strand material traveling longitudinally of the tube in contact with the outer surface thereof at any given point will vary if the relative position of the strand material is changed circumferentially of the tube.

The portions of the tube between the slots therein form a series of spaced, smooth surfaces which support successive portions of the strand material, from which fluid is being removed, and prevent the sharp edges from damaging the strand material. The strand material is moved longitudinally of the tube toward the sharp edges and the tube may be rotated to present sharp edges of the desired shape to the strand material.

Other objects and features of the present invention will be more readily understood from the following detailed description of specific embodiments thereof, when read in conjunction with the accompanying drawings, in which:

Fig. 1 is a fragmentary, side elevational view of an adjustable wiping device for removing fluid from the surfaces of continuously moving, indefinite lengths of strand material being passed through successive sections of a trough containing cooling fluids, with portions thereof broken away for purposes of clarity;

Fig. 2 is an enlarged, fragmentary, vertical sectional view of the wiping device taken along line 2—2 of Fig. 1;

Fig. 3 is an enlarged, fragmentary, sectional view of the wiping device of Fig. 1 taken along line 3—3 of Fig. 2, showing the portion of the wiping device of Fig. 1 which would be presented to the strand material if the wiping device were rotated 45° from the orientation illustrated in Fig. 1;

Fig. 4 is an enlarged, fragmentary, sectional view of the wiping device of Fig. 1 taken along line 4—4 of Fig. 2, showing the portion of the wiping device of Fig. 1 which would be presented to the strand material if the wiping device were rotated 135° from the orientation illustrated in Fig. 1, and Fig. 5 is a fragmentary, plan view illustrating an alternative embodiment of a wiping device of the present invention, with portions thereof broken away for purposes of clarity.

Referring now to the drawings, and more particularly to Figs. 1 to 4, inclusive, there is shown a fragmentary view of a V-shaped, cooling trough, designated generally by the numeral 11, which is divided into two sections 12 and 13 with a drain sump 14 positioned therebetween. The trough 11 contains a suitable cooling fluid 15, such as water or the like. A wiping device, designated generally by the numeral 16, is provided to prevent splashing of the fluid 15. The splashing of the fluid 15 is caused by impingement of the fluid, being carried on an insulated conductor 17 or other type strand material from the section 12 of the trough 11 to the succeeding section 13, against the fluid 15 in the succeeding section 13 which is stationary or moving in an opposite direction. The wiping device 16 may also be used to dry the conductor 17 as it exits from the trough 11 and prior to being wound on a winding drum (not shown) or placed in a package (not shown).

The wiping device 16 includes a cylindrical metallic tube, designated generally by the numeral 18, supported rotatably at opposite ends thereof by mounting members 19 and 21. A series of spaced sharp edges 22—22, each defining an arc of an ellipse, are formed in the tube 18 by milling parallel slots 23—23 through the wall of the cylindrical tube 18 at a desired angle with respect to the longitudinal axis thereof. The slots 23—23 are placed as close to each other as possible without weakening the tube 18 excessively. One side of each of the sharp edges 22—22 is formed by the planar surface 26 of the adjacent side of the associated slot 23, and the other side of each of the sharp edges 22—22 is formed by the curved, arcuately shaped, outer surface 27 of the tube 18. Therefore, the shape of the sharp edges 22—22 defined by an included angle $\beta$ of the intersection of the planar surface 26 and the arcuate surface 27 of the tube 18 in different radial planes containing the longitudinal axis of the tube will vary. The shape of the sharp edges 22—22 presented to successive portions of an indefinite length of the strand material 17 traveling longitudinally of the tube 18 in contact with the outer surface 27 thereof at any given point will vary if the relative position of the strand material 17 is changed circumferentially of the tube 18.

The angle $\beta$ of the edges 22—22 presented to the strand material 17 will be 30° if the tube 18 is in the position illustrated in Fig. 1, approximately 38° if the tube 18 is rotated 45° (see Fig. 3), 90° if the tube is rotated 90°, approximately 142° if the tube is rotated 135° (see Fig. 4), and 150° if the tube is rotated 180°. However, it may be seen that supplementary edges 28—28, which point generally outwardly and toward the right as viewed in Fig. 1, are also formed by the planar surface 29 of the opposite sides of the slots 23—23 and the outer curved surface 27 of the tube 18.

The portions 31—31 of the tube 18 between the slots 23—23 therein form a series of spaced smooth surfaces which cooperate to support successive portions of the strand material 17, from which the fluid 15 is being removed, and prevent the sharp edges 22—22 from damaging the strand material. The strand material 17 is moved longitudinally of the tube 18 toward the sharp edges 22—22, and the tube may be rotated adjustably to present portions of the sharp edges 22—22 of the desired shape to the strand material 17. The tube 18 must be of sufficient length so that all of the fluid 15 clinging to the surface of the successive portions of the strand material 17 will be removed by the sharp edges 22—22, and thus the successive portions of the strand material 17 will be substantially dry when they arrive at the opposite end of the tube 18. It should be noted that for best results it is important that each portion of the strand material 17 be kept in continuous contact with the device 16 until all of the moisture is removed therefrom.

The most desirable or critical angle $\beta$ presented to the strand material 17 may be determined by trial and error. The most desirable angle $\beta$ may be influenced by the type of fluid 15 used, the viscosity and temperature thereof, the size of the strand material 17 and the type of material on the outer surface of the strand material 17 from which the fluid is being removed. The tube 18 may be adjusted to determine the critical angle $\beta$ by loosening a set screw 32 and turning the tube 18 until the most satisfactory wiping action is attained. However, if the critical angle $\beta$ is known, the tube 18 may be rotated in a calibrated sleeve 33 until the known critical angle $\beta$ is presented to the strand material 17. It is obvious that if some other angle $\beta$ smaller than 30° or larger than 150°, as described, is desirable, the slots 23—23 could be placed in the tube 18 in a manner to obtain a different desired angle $\beta$. However, it is important that the slots 23—23 be wide enough to permit the fluid 15 to flow freely therethrough.

The portion of each of the sharp edges 22—22, presented to the strand material 18 at any setting of the tube 18, points in a direction defined arbitrarily by a line falling in a radial plane containing the longitudinal axes of the tube 18 and of the strand material 17 which bisects the included angle $\beta$ formed by the intersection of the planar surface 26 of the adjacent side of the associated slot 23 and the arcuate shape of the peripheral surface 27 of the tube 18. Therefore, the portions of the sharp edges 22—22 presented to the strand material 17 at any instant will have a component of direction upwardly and a component of direction opposite to the direction of travel of the strand material. The portions of each of the sharp edges 22—22 on both sides of the point presented to the strand material 17 curve downwardly and extend diagonally with respect to the longitudinal axis of the strand material 17.

The arbitrarily defined direction of the sharp edges 22—22 at any point will vary obviously as the angle $\beta$ at that point varies. Therefore, not only cross-sectional dimension of the portion of sharp edges 22—22 presented to the strand material 17 may be varied by rotating the tube 18 with respect to the path of travel of the strand material 17, but the direction in which the portions of the sharp edges 22—22 presented to the strand material 17 point may also be varied by rotating the tube 18 with respect to the path of travel of the strand material 17.

A substantially cylindrical arm 36, having a handle 37 on a free end thereof, is mounted rotatably in the tube 18. The arm 36 is provided to permit the tube 18 to be indexed 180° so that portions of the edges 28—28 having the same angle $\beta$ and pointing in the same relative direction, with respect to the direction of travel of the strand material 17, will be presented to the strand material, if it is desirable to reverse the direction of travel of the strand material 17.

The tube 18 may be indexed by turning the arm 36, which is positioned in an enlarged portion 38 of a slot, designated generally by the numeral 39, in the mounting member 21, so that a narrow, notched portion 41 of the arm 36 will line up with a narrow portion 42 of the slot 39 in the mounting member 21 to permit the portion 41 of the arm 36 to slide through the slot 39. The arm 36 may then be revolved 180° and secured in an enlarged, substantially circularly shaped portion 43 of a correspondingly shaped slot, designated generally by the numeral 44, in the opposite side of the mounting member 21. The arm 36 is secured in the substantially circularly shaped portions 38 and 43 in the slots 39 and 44, respectively, on either side of the mounting member 21 by rotating the arm 36 so that the notched portion 41 of the arm 36 is not aligned with the narrow portion of the slots 39 or 44.

A rod 46, having downwardly slanting surfaces, is provided adjacent to each end of the tube 18, so that most of the fluid 15, carried on and along the strand material 17 as a result of the pumping action thereof, is removed by the rod 46 prior to the time that the section of the strand material 17 comes in contact with the slotted tube 18, thus permitting utilization of a shorter tube 18. The rods 46—46 are provided adjacent to both ends of the tube 18 so that the same effect will result regardless of the direction of travel of the strand material 17.

*Alternate embodiment*

Referring now to Fig. 5, there is shown a wiping device, designated generally by the numeral 116, which may be used in a cooling trough, designated generally by the numeral 111, for the same purpose as the wiping device 16. The wiping device 116 includes a slotted member, designated generally by the numeral 118, having a substantially U-shaped cross section. The member 118 decreases in cross-sectional dimension and tapers in a direction opposite to that of the path of travel of a continuously moving, indefinite length of strand material 117. The member 118 is provided to remove fluid 115 from the strand material 117 passing in contact therewith. The slots 123—123 may be cut in the member 118 at different angles so that edges 122—122 of different shapes are presented to the strand material 117. A tapered rod 146 is positioned adjacent to the entrance end of the slotted member 118. The diameter of the tapered rod 146 increases in the direction of travel of the strand material 117 moving in contact therewith, so that it will accommodate varying sizes of strand material 117 and fluids 115 having varying properties.

By passing the strand material 117 over the tapered rod 146, it will pass over a section of the rod 146 having a critical radius of curvature, if such exists. Further, by varying the cross-sectional dimension of the slotted member 118, the same result will exist with respect to any critical dimension of the radius of curvature of the surface of the slotted member 118 as influenced by the size and property of the strand material 117 and the properties of various types of fluid 115 which may be removed from the surface thereof.

The slotted members 18 and 118 may be solid or hollow; however, a hollow member has been found more satisfactory in that it provides an internal exit conduit for the fluids being removed from the strand materials and prevents the fluids from remaining in the slots of the members.

In actual practice, all discernible water has been removed from polyethylene-insulated conductors having an outside diameter of approximately 0.076 inch, which where exiting from a cooling bath at approximately 1750 feet per minute, by using a seven-foot, slotted, cylindrical tube similar to the tube 18. The outside diameter of the tube was approximately one inch with a wall thickness of approximately one-eighth inch. One hundred and thirteen slots were placed in the tube to form sharp edges. The angle β of the cross section of the portion of the sharp edges presented to the insulated conductor by the tube was approximately 60°. However, it was determined that satisfactory wiping action was not achieved by using an angle β greater than 65°.

In actual practice, it was not perceptible that water was being removed from the portion of the insulated conductor contacting the initial portion of the slotted tube. However, at a certain later point in the path of travel of the insulated conductor, the water disappeared with unexpected rapidity and all discernible moisture was removed by the time successive portions of the conductor arrived at the end of the tube.

It is to be understood that the above-described arrangements are simply illustrative of the principles of the invention. Other arrangements may be devised by those skilled in the art which will embody the principles of the invention and fall within the spirit and scope thereof.

What is claimed is:

1. A device for removing fluid from the surface of a continuously moving, indefinite length of strand material, which comprises an elongated member having a series of slots in the periphery thereof, a series of sharp edges on the periphery of the member formed by corresponding sides of the slots and the peripheral surface of the member, the sharp edges extending in a general direction transverse to the path of travel of the strand material and pointing in a direction generally opposite to the direction of travel of the strand material, and a series of smooth surfaces formed by successive portions of the member between the slots for supporting successive portions of the strand material and preventing the strand material from being damaged by the sharp edges as the strand material is moved longitudinally of the member adjacent to the sharp edges so that the sharp edges remove the fluid from the surface of the strand material.

2. A device for removing fluid from the surface of a continuously moving, indefinite length of strand material, which comprises a hollow, cylindrical member having a series of parallel slots through the wall thereof, a series of sharp edges on the periphery of the member formed by planar surfaces of corresponding sides of the slots and the curved peripheral surface of the member, the sharp edges extending in a general direction transverse to the path of travel of the strand material and pointing in a direction generally opposite to the direction of travel of the strand material, and a series of smooth surfaces formed by successive portions of the member between the slots for supporting successive portions of the strand material and preventing the strand material from being damaged by the sharp edges as the strand material is moved longitudinally of the member adjacent to the sharp edges so that the sharp edges remove the fluid from the surface of the strand material.

3. A device for removing fluid from the surface of a continuously moving, indefinite length of strand material, which comprises an elongated member having a series of slots in the periphery thereof, a series of sharp edges on the periphery of the member formed by corresponding sides of the slots and the peripheral surface of the member, the sharp edges extending in a general direction transverse to the path of travel of the strand material and pointing in a direction generally opposite to the direction of travel of the strand material, a series of smooth surfaces formed by successive portions of the member between the slots for supporting successive portions of the strand material and preventing the strand material from being damaged by the sharp edges as the strand material is moved longitudinally of the member adjacent to the sharp edges so that the sharp edges remove the fluid from the surface of the strand material, and a rod having downwardly slanting surfaces on the upper portion thereof which is adjacent to the path of travel of the strand material and in contact therewith at the entrance end of the slotted tube for removing most of the fluid from the stand material.

4. A device for removing fluid from the surface of a continuously moving, indefinite length of strand material, which comprises an elongated member having a series of parallel slots in a curved portion of the periphery thereof, a series of sharp edges on the periphery of the member formed by planar surfaces of corresponding sides of the slots and the curved peripheral surface of the member, the included angle on a radial plane between the planar surfaces and curved surface varying at different points around the periphery of the member, the sharp edges extending in a general direction transverse to the path of travel of the strand material and pointing in a direction generally opposite to the direction of travel of the strand material, a series of smooth surfaces formed by successive portions of the member between the slots for supporting successive portions of the strand material and preventing the strand material from being damaged by the sharp edges as the strand material is moved longitudinally of the member adjacent to the sharp edges so that the sharp edges remove the fluid from the surface of the strand material, and means for changing the portion of the elongated member and thus the shape of the sharp edges presented to the strand material at any instant to accommodate different types of strand material and fluids having different properties being removed therefrom.

5. A device for removing fluid from the surface of a continuously moving, indefinite length of strand material, which comprises an elongated cylindrical member having a series of parallel slots in the curved surface thereof, a series of sharp edges on the periphery of the member formed by planar surfaces of corresponding sides of the slots and the curved peripheral surface of the member, a second series of sharp edges on the periphery of the member formed by the curved peripheral surface of the member and planar surfaces of corresponding sides of the slots parallel to said first-mentioned sides, each series of the sharp edges extending transversely of the member and pointing generally toward opposite ends of the member, the included angle between the curved surface of the member and the planar surfaces of each side of the slots being supplements of each other and varying at different radial planes containing the longitudinal axes of the strand material and the member as the relative circumferential position of the strand material is changed, a series of smooth surfaces formed by successive portions of the member between the slots for supporting successive portions of the strand material and preventing the strand material from being damaged by the sharp edges as the strand material is moved longitudinally of the member adjacent to the sharp edges so that the sharp edges remove the fluid from the surface of the strand material, means for adjusting the orientation of the slots with respect to the path of travel of the strand material and thus the shape and direction of the portion of the sharp edges contacting the strand material to accommodate different types of strand material and fluids of different properties being removed therefrom, a rod having downwardly slanting surfaces on the upper portion thereof which is adjacent to the path of travel of the strand material and in contact therewith at both ends of the slotted member for removing excessive amounts of fluid from the strand material moving longitudinally of the tube in either direction, and means for indexing the tube 180° to permit the device to be used for removing fluid from strand material traveling axially of the device in either direction.

6. A device for removing fluids from the surface of continuously moving, indefinite lengths of strand material, which comprises a slotted member having a substantially inverted U-shaped cross section, the radius of curvature of the slotted member increasing in the direction of travel of the strand material, and sharp edges formed by the slots in the member which extend transversely of the path of travel of the strand material and point in a general direction opposite to that of the direction of travel of the strand material for removing fluids from the surface thereof.

7. A device for removing fluids from the surface of continuously moving, indefinite lengths of strand material, which comprises a slotted curved member having a substantially inverted U-shaped cross section, the radius of curvature of the slotted member increasing in the direction of travel of the strand material, sharp edges formed by the slots in the member which extend transversely of the path of travel of the strand material and point in a general direction opposite to that of the direction of travel of the strand material for removing fluids from the surface thereof, and a rod having downwardly slanting surfaces positioned adjacent to the entrance end of the slotted member for removing excessive amounts of fluid from the surface of the strand material prior to its contacting the slotted member, said rod tapering so as to increase in diameter in a direction toward the slotted member to provide critical diameters of various sizes for various types of strand material and various types of fluids being removed from the strand material.

References Cited in the file of this patent

UNITED STATES PATENTS

| | | |
|---|---|---|
| 426,969 | Stiner et al. | Apr. 29, 1890 |
| 1,236,359 | Reynolds | Aug. 7, 1917 |
| 2,081,456 | Howard | May 25, 1937 |
| 2,807,891 | Roscoe | Oct. 1, 1957 |